United States Patent [19]

Ritter et al.

[11] Patent Number: 5,598,617
[45] Date of Patent: Feb. 4, 1997

[54] WIRE INSERTION APPARATUS

[75] Inventors: Klaus Ritter; Gerhard Ritter, both of Graz, Austria

[73] Assignee: EVG Entwicklungs–u.Verwertungs–Gesellschaft m.b.H., Raaba, Austria

[21] Appl. No.: 436,241

[22] PCT Filed: Sep. 16, 1994

[86] PCT No.: PCT/AT94/00132

§ 371 Date: May 17, 1995

§ 102(e) Date: May 17, 1995

[87] PCT Pub. No.: WO95/09704

PCT Pub. Date: Apr. 13, 1995

[30] Foreign Application Priority Data

Oct. 1, 1993 [AT] Austria ................... 1974/93

[51] Int. Cl.$^6$ ............... B23P 15/00; A43D 61/00
[52] U.S. Cl. ................ 29/33 F; 227/69; 227/80
[58] Field of Search ............... 29/33 F, 432, 29/241, 33 R; 227/80, 69, 67, 71; 226/91; 140/105

[56] References Cited

U.S. PATENT DOCUMENTS 4,506,818 3/1985 Ritter et al. ............... 227/80 X
4,706,362 11/1987 Strausberg ............... 29/432
5,115,957 5/1992 Smith et al. ............... 29/33 F

FOREIGN PATENT DOCUMENTS 372886 11/1983 Austria .
0389465A3 9/1990 European Pat. Off. .

*Primary Examiner*—William R. Briggs
*Attorney, Agent, or Firm*—Frishauf, Holtz, Goodman, Langer & Chick, P.C.

[57] ABSTRACT

An apparatus for inserting wire into an intermittently fed insulating body (I) of a structural element (B), with a wire supply device (6, 7) disposed on a pivotable base plate (1) and with a device (15, 16, 21) for forming and shaping a wire receiving duct, wherein, in the feed direction of the structural element, the forming and shaping device is disposed in front of the wire supply device as well as at the same angle as it and on the same side of the insulating body and is fixedly connected with the wire supply device, can be moved together with it in the direction toward the insulating body of the structural element and away from it and is pivotable together with it.

13 Claims, 1 Drawing Sheet

WIRE INSERTION APPARATUS

FIELD OF THE INVENTION

The invention relates to an apparatus for inserting wire into an intermittently fed insulating body of a structural element, with a wire supply device disposed on a pivotable base plate and with a device for forming and shaping a wire receiving duct, wherein, in the feed direction of the structural element, the forming and shaping device is disposed in front of the wire supply device as well as at the same angle as it and on the same side of the insulating body and has a lancing tool.

BACKGROUND

In an apparatus of the type known from U.S. Pat. No. 5,167,360, Ritter, to which EP-389 465 corresponds, the wire supply device is disposed on a base frame and, separated from it, a device for forming and shaping a wire receiving duct in the insulating body, which is linearly displaceable and pivotable synchronously with the wire supply device. A plurality of forming and shaping devices, placed on top of each other in a vertical direction, can be provided. The known device has the disadvantage that the forming and shaping device is disposed separated from the wire supply device and must therefore be separately triggered and displaced, and that the distance between the forming and shaping device and the wire supply device is fixedly preset.

THE INVENTION

It is an object to provide an apparatus of of the type recited at the outset which avoids the described disadvantages and allows a common actuation of the forming and shaping device and the wire supply device as well as their rapid adaptation to different dimensions of the insulating body and different web wire divisions of the structural element. The device in accordance with the invention is distinguished in that the forming and shaping device, fixedly connected with the wire supply device, can be moved together with it in the direction toward the insulating body of the structural element and away from it and is also pivotable together with the wire supply device.

In accordance with an embodiment which is particularly preferred from the structural viewpoint, a carriage, which can be displaced in the direction toward the insulating body and away from it, is provided on the pivotable base plate and has at least one feed clamp for feeding a web wire and at least one lancing needle disposed at a selectable distance from the feed clamp for forming and shaping the receiving duct in the insulating body.

In accordance with a further characteristic of the invention, the carriage has a laterally protruding adjusting rail, on which a lancing bar for receiving at least one lancing needle is disposed, which is linearly displaceable on the lancing bar and can be fixed in place by means of a clamping device.

In accordance with the invention, the distance between the lancing needle and the insertion line of the web wire defined by the feed clamp can be selected in accordance with the web wire division in the structural element and/or corresponding to a multiple thereof.

In accordance with a special embodiment of the invention it is provided that the web wire can be pulled off an endless wire supply by means of the feed clamp and the return stop and can be cut off the wire supply by means of a cutting device consisting of a cutting nozzle and a cutter, and that each lancing needle is located in a horizontal plane together with the associated return stop as well as the cutting nozzle of the associated cutting device.

By means of the invention it is achieved that the required web wires having the respectively required division can be fed through the insulating body without problems and with great accuracy, wherein triggering of the individual devices can take place in a simple manner.

DRAWINGS

Further characteristics and advantages of the invention will be explained in detail below by means of an exemplary embodiment, making reference to the drawings. Shown are in:

FIG. 1, a schematic horizontal section through the apparatus of the invention, wherein a lancing needle as well as a web wire to be fed in are shown in the upper half of the drawing figure during their movement through the insulating body, and FIG. 2, a detail of a lancing bar with a plurality of lancing needles in a lateral view.

DETAILED DESCRIPTION

Figure 1:
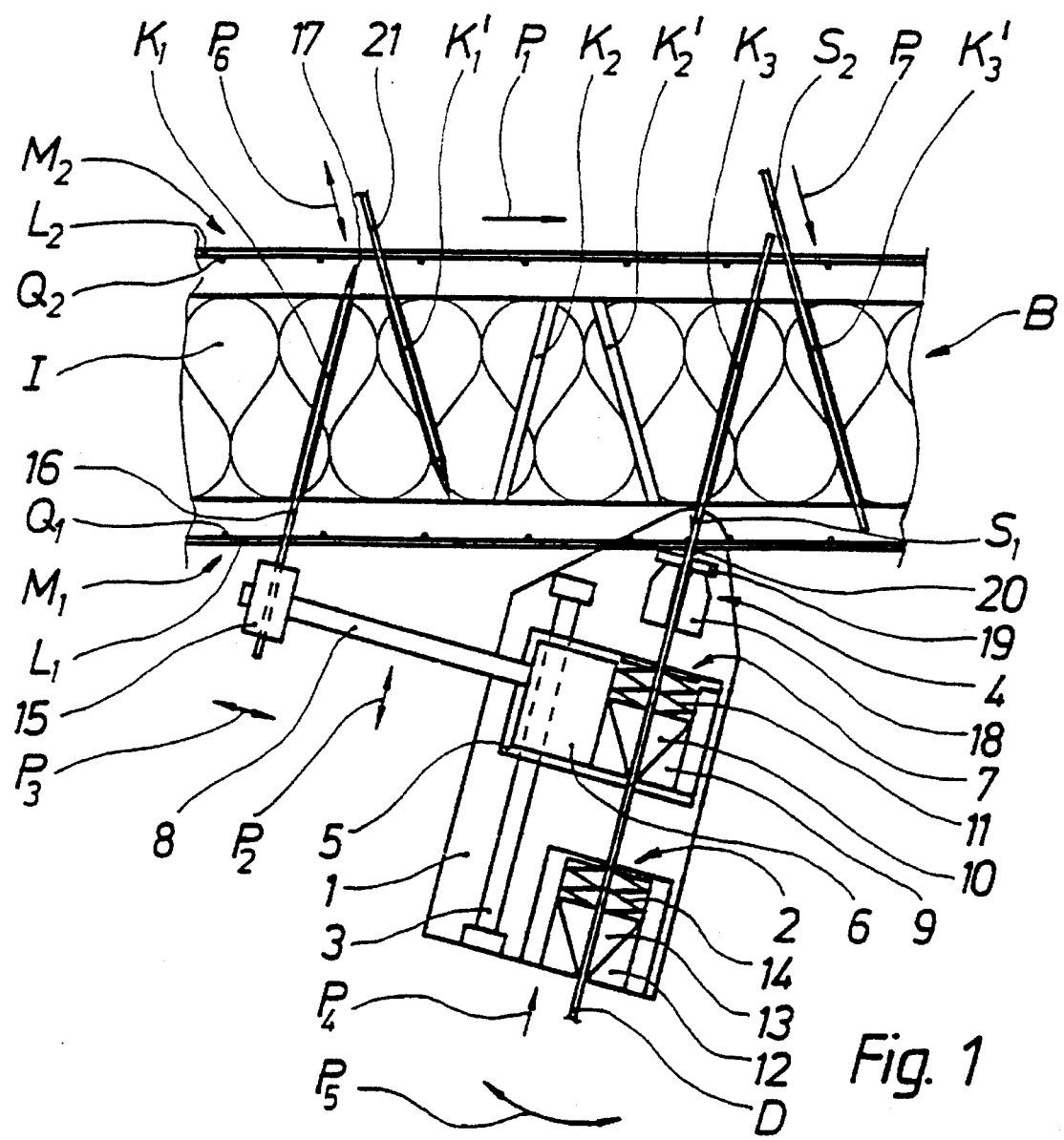

The apparatus in accordance with FIG. 1 is employed for producing a structural element B which is described in AT-PS 372 886, for example. The structural element B consists of two flat wire mesh mats $M_1$ and $M_2$ disposed on either side of an insulating body I and formed of linear wires $L_1$ or $L_2$, extending vertically in respect to each other and welded together, and transverse wires $Q_1$ or $Q_2$, wherein the wire mesh mats $M_1$ and $M_2$ are connected with each other by web wires $S_1$ and $S_2$ into a dimensionally stable unit.

Within the scope of the invention it is also possible to use wire mesh webs consisting of welded-together linear and transverse wires instead of the wire mesh mats $M_1$ and $M_2$, wherein these are cut up at the end of the manufacturing process in order to constitute structural elements of predetermined length. In the course of the manufacturing process the wire mesh mats $M_1$ and $M_2$ or the corresponding wire mesh webs are advanced in steps in accordance with the arrow $P_1$, together with the insulating body.

The apparatus has a base plate 1 supporting at least one return stop 2, one guide rail 3 extending in the direction toward the structural element B and at least one cutting device 4. A carriage 5 can be displaced in accordance with the two-headed arrow $P_2$ on the guide rail 3 with the aid of a drive device, not represented, for example a work cylinder, crank drive, motor drive, or the like. For feeding a wire D constituting the web wire $S_1$, a vertical drawing bar 6 with at least one feed clamp 7, acting as a wire supply device, as well as a laterally projecting adjusting rail 8 are disposed on the carriage 5.

Each feed clamp 7 has two wedge-shaped drawing cheeks 9 fixedly connected with the drawing bar 6, two movable, wedge-shaped clamping cheeks 10 cooperating with the drawing cheeks 9, as well as a spring 11, which presses the clamping cheeks 10 against the drawing cheeks 9. The return stop 2 disposed on the base plate 1 is constructed analogously to the feed clamp 7 and has two wedge-shaped blocking cheeks 12, fixedly connected with the base plate 1, two movable, wedge-shaped clamping cheeks 13 cooperating with the blocking cheeks 12, as well as a spring 14, which presses the clamping cheeks 13 against the blocking cheeks 12.

A vertical lancing bar 15 is disposed on the projecting end of the adjusting rail 8, which is adjustable in accordance with the two-headed arrow $P_3$ with the aid of drive means, not represented, such as a work cylinder, displacement spindle, or the like, and can be fixed in place on the adjusting rail 8. At least one lancing needle 16 is attached to the lancing bar 15 in such a way that its free, projecting end extends perpendicularly in respect to the adjusting rail 8 and perpendicularly to the lancing bar 15 in the direction toward the structural element B. The cross-sectional shape of the lancing needle 16 is preferably round, wherein the diameter of the lancing needle 16 is at least equal to the diameter of the web wire $S_1$ to be fed through the insulating body, but is preferably larger than the diameter of the web wire $S_1$. The lancing needle 16 is provided with a wear-resistant, preferably hardened tip 17 on its free end.

The described apparatus operates in the following manner: The lancing needle 16 is moved against the structural element B by means of the feeding movement of the carriage 5 in the direction of the two-headed arrow $P_2$ toward the structural element B. In the process the tip 17 enters the insulating body I and forms a receiving duct $K_1$ in the insulating body I during the feeding movement. The feeding movement of the carriage 5 is terminated when the tip 17 has completely penetrated through the insulating body I and has emerged from the opposite side of the insulating body I. To ease the penetration of the insulating body I, the lancing needle 16, or only its tip 17, can be preheated, for example by means of an induction coil or, in the manner of a soldering iron, by means of a heating cartridge.

Simultaneously with the feeding movement of the lancing needle 16, the wire D is pulled with the aid of the feed clamp 7 off a supply spool, not represented, as a result of the advancing movement of the carriage 5 and is fed in accordance with the arrow $P_4$ along an insertion line defined by the drawing cheeks 9 and their feeding movement.

By means of the feeding movement of the feed clamp 7 toward the structural element B, the clamping cheeks 10 are pressed, in addition to the action of the spring 11, against the web wire $S_1$ because of the wedge-shaped design of the drawing cheeks 9 containing them, and take it along. To increase the frictional connection with the web wire $S_1$, the clamping cheeks 10 have been additionally provided with teeth on their side facing the web wire $S_1$. During its feeding, the web wire $S_1$ simultaneously pushes the clamping cheeks 13 of the return stop 2 against the spring 14 and toward the wider end of the wedge-shaped opening of the clamping cheeks 12, so that the clamping cheeks 12 offer practically no resistance to the feeding movement of the web wire $S_1$. The web wire $S_1$ is guided through a cutting nozzle 18 of the cutting device 4, which is aligned with the insertion line, and through a receiving duct $K_3$ formed in the previous work cycle with the aid of the lancing needle 16 in the insulating body I. The feeding movement of the web wire $S_1$ is continued until the front section of the web wire $S_1$ just projects past the plane of the wire mesh mat $M_2$ and therefore can be welded together in a succeeding work cycle with the appropriate wires $L_2$ and $Q_2$ of the wire mesh mat $M_2$. The length of the feed path of the lancing needle 16 and of the web wire $S_1$ correspond exactly with each other. At the termination of the feeding movement, the web wire $S_1$ is severed from the wire D with the aid of a cutter 19 of the cutting device 4 and is subsequently welded together at its end facing away from the cutting device 4 with an appropriate mesh wire $L_2$ or $Q_2$ of the wire mesh mat $M_2$.

The carriage 5 returns into its initial position, in the course of which the lancing needle 16 is pulled out of the receiving duct $K_1$ and the clamping cheeks 10 of the feed clamp 7 release the wire D, while the clamping cheeks 13 of the return stop 2 now keep the web of material in its place and prevent its being pushed back in the direction toward the supply spool.

It is also possible within the scope of the invention to remove an already cut-to-size, straightened wire from a supply magazine and to insert it with the aid of the wire supply device along the insertion line into the preformed receiving duct $K_3$. In this case the return stop 2 and the cutting device 4 remain without function.

The base plate 1 is pivotably seated in accordance with the two-headed arrow $P_5$ in the pivot 20, so that arbitrary angles between the web wires $S_1$ and the lancing needle 16, on the one hand, and the linear wires $L_1$, $L_2$ of the wire mesh mats $M_1$, $M_2$, on the other hand can be set.

The distance of the lancing needle 16 from the insertion line of the web wire $S_1$ corresponds to the desired web wire division in the structural element B, however, it can also be a multiple thereof within the scope of the invention. Since the web wire division within a structural element or in the course of producing structural elements of endless wire mesh webs can be different, between the work cycles of the apparatus and preferably during the feeding of the structural element B, the lancing element 15 is displaced during the manufacturing process on the adjusting rail 8 in accordance with the two-headed arrow $P_3$ for the purpose of adaptation to various web wire divisions, and is fixed in place there in the new working position. A receiving duct formed with a different web wire division is identified by $K_2$ in FIG. 1.

In the course of producing the structural elements B, the web wires are in most cases fed from the two oppositely located sides of the structural element B, so that an apparatus in accordance with the invention is disposed on both sides of the structural element to be produced. For reasons of clarity, only one second lancing needle 21 and an additional web wire $S_2$ have been represented in FIG. 1. The lancing needle 21 moves in accordance with the two-head arrow $P_6$, while the web wire $S_2$ is fed in accordance with the arrow $P_7$. The movement of the lancing needle 21 in the direction toward the structural element B and the movement of the web wire $S_2$ through the insulating body I take place simultaneously and together. The lancing needle 21 and the web wire $S_2$ are shown in an instantaneous view during their respective feeding movements, shortly before they have reached their end position. The receiving ducts for the web wire $S_2$ formed from this side in the insulating body I with the aid of the lancing needle 21 are indicated in correspondence to the receiving ducts formed from the other side, as described above, but have been additionally provided with an apostrophe.

Figure 2:
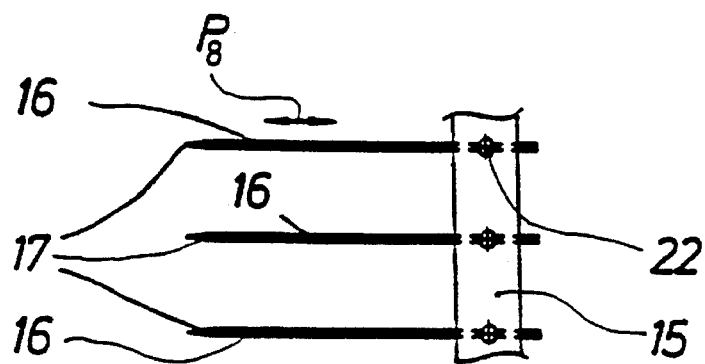

Several feed clamps are disposed at selectable distances above each other on the drawing bar 6 for the simultaneous supply of several web wires, and several associated return stops 2 and cutting devices 4 are disposed fixed in place above each other in the appropriate positions on the base plate 1. As represented in FIG. 2, several lancing needles 16 are disposed above each other on the lancing bar 2 at appropriate distances for forming the respective receiving ducts. Each lancing needle 16, together with the insertion line of the associated feed clamp 7, the associated cutting nozzle 18 and the associated return stop 2, is located in a horizontal plane. During the insertion of the precut web wires into the receiving duct $K_3$, each lancing needle 16, together with the associated insertion device, is located in a horizontal plane.

For the purpose of adaptation to different thicknesses of the insulating body I, all lancing needles 16 can be displaced together by means of a drive device, not represented, for example an advancement spindle, drive chain, or the like, in the horizontal direction in accordance with the two-headed arrow $P_8$. They are fixed in their working positions by means of a clamping device 22, for example with the aid of a clamping screw, in the lancing bar 15.

It is understood that the described exemplary embodiment can be variously changed within the scope of the general inventive concept, particularly in regard to the cross-sectional shape of the lancing needle which, for example, can also be formed to be square. In this case the dimensions of the lancing needle must be selected to be such that a sufficiently large receiving duct is formed in the insulating body, so that the web wire can be easily pulled through.

We claim:

1. An apparatus for inserting wire into an intermittently fed insulating body of a structural element, with a wire supply device disposed on a pivotable base plate and with a device for forming and shaping a wire receiving duct, wherein, in the feed direction of the structural element, the forming and shaping device is disposed in front of the wire supply device as well as at the same angle as it and on the same side of the insulating body and has a lancing tool, characterized in that the forming and shaping device (15, 16, 21), fixedly connected with the wire supply device (6, 7), can be moved together with it in the direction toward the insulating body (I) of the structural element (B) and away from it and is pivotable together with it.

2. An apparatus in accordance with claim 1, characterized in that a carriage (5), which can be displaced in the direction toward the insulating body (I) and away from it, is provided on the pivotable base plate (1) and has at least one feed clamp (7) for feeding a web wire ($S_1$, $S_2$) and at least one lancing needle (16, 21) disposed at a selectable distance from the feed clamp (7) for forming and shaping the receiving duct ($K_1$, $K_2$, $K_3$, $K_{1'}$, $K_{2'}$, $K_{3'}$), in the insulating body (I).

3. An apparatus in accordance with claim 2, characterized in that the lancing needle (16, 21) has a wear-resistant tip.

4. An apparatus in accordance with claim 2, characterized in that the lancing needle (16, 21) has a round cross-sectional shape, wherein the diameter of the lancing needle (16, 21) is at least equal to the diameter of the web wire ($S_1$, $S_2$), an.

5. An apparatus in accordance with claim 2, characterized in that the lancing needle (16, 21) is reheatable.

6. An apparatus in accordance with claim 2, characterized in that a carriage (5) is provided, which can be displaced in the direction towards the insulating body (I) and away from it, and has a laterally protruding adjusting rail (8), on which a lancing bar (15) for receiving said at least one lancing needle (16, 21) is disposed, which is linearly displaceable on the lancing bar and can be fixed in place by means of a clamping device (22).

7. An apparatus in accordance with claim 6, characterized in that the supply device (6, 7) includes at least one feed clamp; and selective adjustment means ($P_3$) are provided for setting the distance between the lancing needle (16, 21) and feed clamp (7) to permit setting said distance in accordance with the web wire division in the structural element (B) and/or corresponding to a multiple thereof.

8. An apparatus in accordance with claim 7, characterized in that the web wire ($S_1$, $S_2$) can be pulled off from a wire supply (D) by means of the feed clamp (7) and a return stop (2);

cutting device (4) including a cutting nozzle (18) and a cutter (19) is provided for cutting off the wire from the wire supply; and wherein, each lancing needle (16, 21), together with a respective associated return stop (2), as well as the cutting nozzle (18) of the associated cutting device (4), are located in a horizontal plane.

9. An apparatus in accordance with claim 1, characterized in that the carriage (5) has a drawing bar (6), which supports at least one feed clamp (7).

10. An apparatus in accordance with claim 2, characterized in that said at least one lancing needle comprises a plurality of lancing needles (16, 21) disposed in the vertical direction at a selectable distance on a lancing bar (15), and a plurality of feed clamps (7) are provided, located at selectable distances on the drawing bar (6).

11. An apparatus in accordance with claim 3 wherein said tip is a hardened tip.

12. An apparatus as in claim 4 wherein the diameter of the lancing needle is larger than the diameter of the web wire.

13. An apparatus as in claim 5 wherein the lancing needle has a reheatable tip.

* * * * *